United States Patent
Nelson

(10) Patent No.: US 11,962,056 B2
(45) Date of Patent: Apr. 16, 2024

(54) ENHANCED BANDWIDTH INTERCONNECT

(71) Applicant: ROCKLEY PHOTONICS LIMITED, Altrincham (GB)

(72) Inventor: David Arlo Nelson, Fort Collins, CO (US)

(73) Assignee: Rockley Photonics Limited, Altrincham (GB)

( * ) Notice: Subject to any disclaimer, the term of this patent is extended or adjusted under 35 U.S.C. 154(b) by 353 days.

(21) Appl. No.: 17/362,892

(22) Filed: Jun. 29, 2021

(65) Prior Publication Data

US 2022/0013879 A1 Jan. 13, 2022

Related U.S. Application Data

(60) Provisional application No. 63/050,080, filed on Jul. 9, 2020.

(51) Int. Cl.
*H01P 3/02* (2006.01)
*H01P 5/00* (2006.01)

(52) U.S. Cl.
CPC . *H01P 3/02* (2013.01); *H01P 5/00* (2013.01)

(58) Field of Classification Search
CPC .......................................................... H01P 3/02
USPC ........................................................... 327/108
See application file for complete search history.

(56) References Cited

U.S. PATENT DOCUMENTS 7,190,240 B2 * 3/2007 Podell ..................... H01P 5/187
333/117

OTHER PUBLICATIONS

Jensen, T. et al., "Coupled Transmission Lines as Impedance Transformer", IEEE Transactions on Microwave Theory and Techniques, 55(12), 2007, pp. 1-9, IEEE.

* cited by examiner

*Primary Examiner* — Tomi Skibinski
(74) *Attorney, Agent, or Firm* — Lewis Roca Rothgerber Christie LLP

(57) ABSTRACT

An enhanced bandwidth interconnect circuit. In some embodiments the circuit includes a two-terminal device and a network for forming a connection to the two-terminal device. The network may include a first set of coupled transmission lines and a second set of coupled transmission lines. A second end of the first set of coupled transmission lines may be connected to a first end of the second set of coupled transmission lines, and a second end of the second set of coupled transmission lines may be connected to the two-terminal device.

11 Claims, 5 Drawing Sheets

ENHANCED BANDWIDTH INTERCONNECT

CROSS-REFERENCE TO RELATED APPLICATION(S)

The present application claims priority to and the benefit of U.S. Provisional Application No. 63/050,080, filed Jul. 9, 2020, entitled "ENHANCED BANDWIDTH WIREBOND INTERCONNECT", the entire content of which is incorporated herein by reference.

FIELD

One or more aspects of embodiments according to the present disclosure relate to interconnects, and more particularly to an enhanced bandwidth interconnect.

BACKGROUND

High-speed connections to electronic components, such as an electro-absorption modulator, may be made in part using wirebonds, or other conductors (e.g., conductive traces on an integrated circuit) which may present a significant inductance and limit the bandwidth of the system.

Thus, there is a need for an improved interconnect configuration.

SUMMARY

According to an embodiment of the present invention, there is provided a circuit, including: a two-terminal device; and a network for forming a connection to the two-terminal device, the network including: a first set of coupled transmission lines; and a second set of coupled transmission lines, a second end of the first set of coupled transmission lines being connected to a first end of the second set of coupled transmission lines, and a second end of the second set of coupled transmission lines being connected to the two-terminal device.

In some embodiments: the first set of coupled transmission lines includes three transmission lines; the second set of coupled transmission lines includes two transmission lines; and at the second end of the first set of coupled transmission lines: a first transmission line of the first set of coupled transmission lines is connected to a first transmission line of the second set of coupled transmission lines, a second transmission line of the first set of coupled transmission lines is connected to a second transmission line of the second set of coupled transmission lines, a third transmission line of the first set of coupled transmission lines is connected to the first transmission line of the second set of coupled transmission lines.

In some embodiments, the first end of the first transmission line of the first set of coupled transmission lines is connected to RF ground through a resistor.

In some embodiments, a first end of the second transmission line of the first set of coupled transmission lines is connected to RF ground through a resistor-capacitor network, the resistor-capacitor network being a parallel combination of: a first resistor, and a series combination of a second resistor and a capacitor.

In some embodiments, a first end of the third transmission line of the first set of coupled transmission lines is connected to a high-speed driver.

In some embodiments, the transmission lines of the first set of coupled transmission lines are arranged side by side with a middle transmission line in the middle, and the other two transmission lines on either side of the middle transmission line.

In some embodiments, the middle transmission line is the second transmission line of the first set of coupled transmission lines.

In some embodiments, the middle transmission line is the first transmission line of the first set of coupled transmission lines.

In some embodiments, the first set of coupled transmission lines includes three wirebonds.

In some embodiments, the second set of coupled transmission lines includes two conductive traces.

In some embodiments, the two-terminal device is an electro-absorption modulator.

In some embodiments, the two-terminal device is a photodiode.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of an enhanced bandwidth interconnect provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
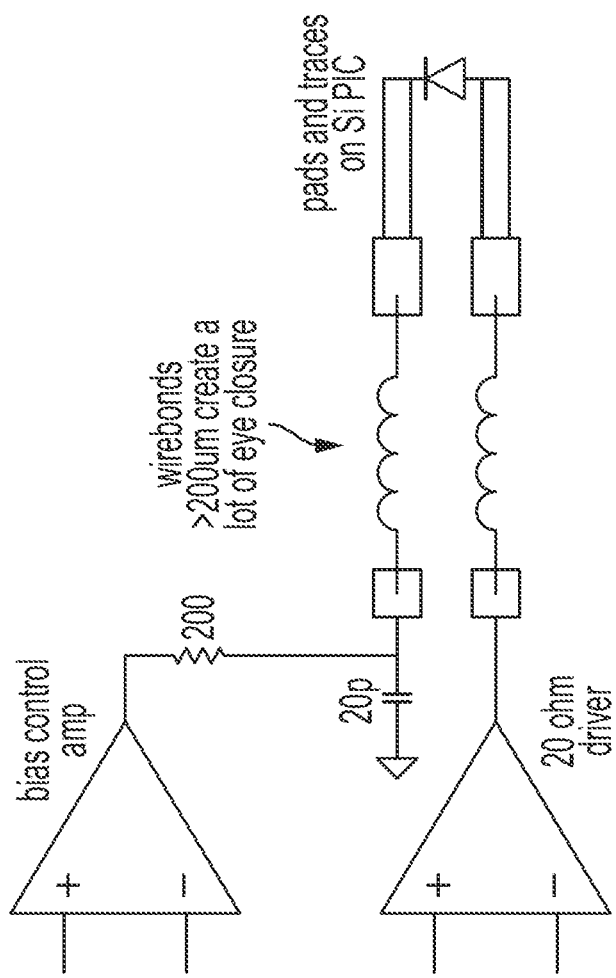
FIG. 1A is a circuit for driving a two-terminal device, according to an embodiment of the present disclosure.
Figure 1B:
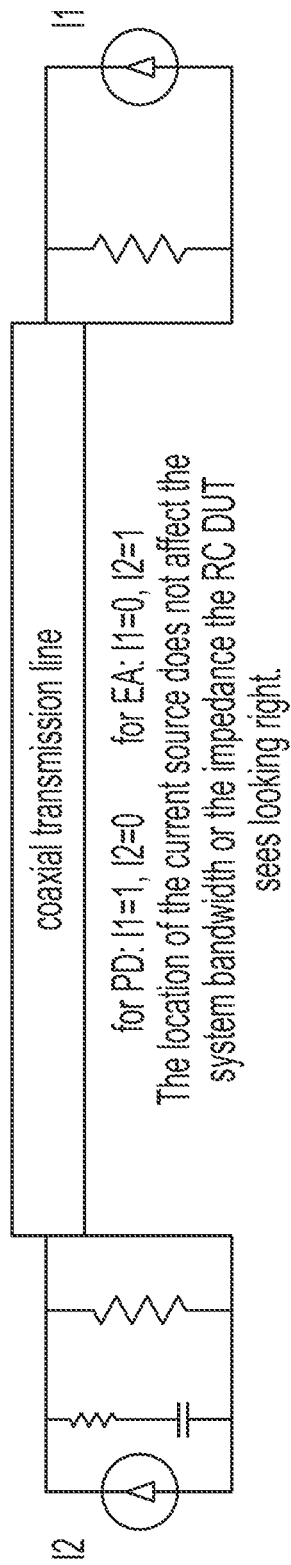
FIG. 1B is a circuit for connecting to a two-terminal device, according to an embodiment of the present disclosure.

To achieve 100 Gbps PAM4 modulation rates, a drive circuit with 35 GHz overall bandwidth may be employed. Using a 20 ohm-50 ohm driver, connected to a two-terminal device (e.g., an InP electro-absorption modulator (EAM, or EA)) to be driven, using wirebonds and on-chip metal traces, interconnect lengths ranging from 350 um to 500 um may result. Given that an interconnect of this type appears approximately inductive with an inductance in the range of 0.7 to 1 pH per micron (um) of interconnect, and given that the EAM capacitance may be in the range of 50 fF-150 fF, an LC resonant frequency that is substantially lower than 35 GHz may be present. As a result, the interconnect may resonate at a frequency lower than 35 GHz, which may be an obstacle to achieving higher bandwidth. FIG. 1A shows an example of a circuit that may be affected by such a bandwidth limitation. FIG. 1B illustrates that a circuit in which a two-terminal device is driven (e.g., a circuit in which the two-terminal device is an EAM) may be analogous to, and have similar bandwidth as, a circuit in which the two-terminal device is the signal source, e.g., a photodiode (PD) is the signal source.

Figure 2A:
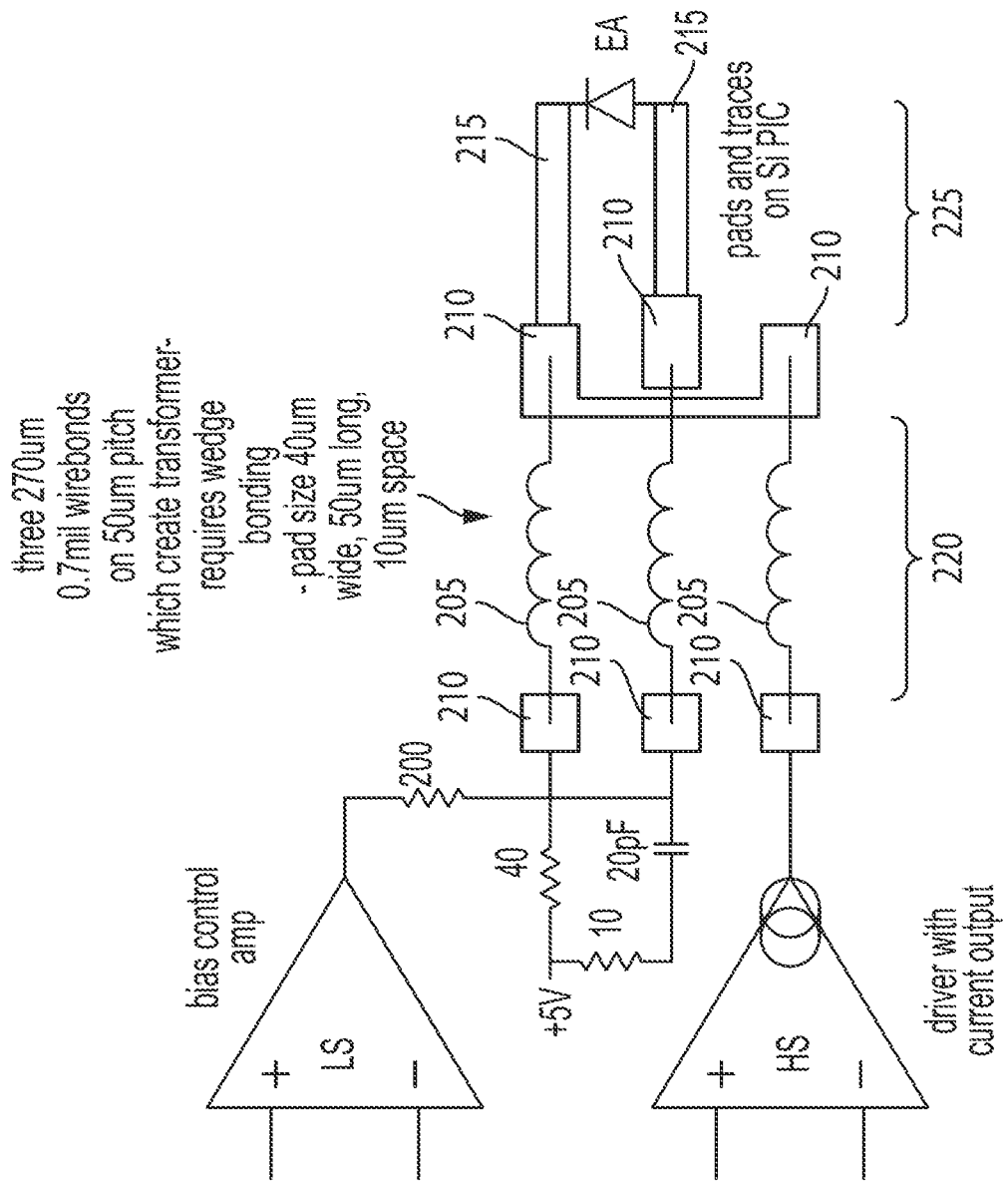
FIG. 2A is a circuit for driving a two-terminal device, according to an embodiment of the present disclosure.

Some embodiments allow this constraint to be overcome, and overall bandwidths approaching 50 GHz may be achievable. Such bandwidths may allow modulation at 100 Gbps with wider eye-opening, lower Transmitter Dispersion Eye Closure Quaternary (TDECQ), and generally improved performance. Referring to FIG. 2A, for example, in some embodiments three wirebonds 205 are used to connect a low-speed driver (LS), or "bias control amp", and a high-speed driver (HS), to wirebond pads 210 on a silicon photonic integrated circuit (PIC, or "Si PIC"), on which the wirebond pads are then connected to an electro-absorption modulator by conductive traces 215, each of which may have a length of about (e.g., within 50 microns of) 180 microns. In FIG. 2A (and in FIG. 3), the +5V terminal and the output of the bias control amplifier are both RF grounds, e.g., as a result of shunt capacitors to ground (not shown in FIG. 2A and FIG. 3). In FIG. 2A, a first wirebond 205 and a third wirebond 205 are connected together at the second end of the set of wirebonds 205 (the second end being the end at which they are connected to the conductive traces 215). At the first end, the third wirebond 205 is connected to the high-speed driver and the first wirebond 205 is connected, through a resistor (e.g., through a 40 ohm resistor) to RF ground. A second wirebond 205 is connected, at the first end, to RF ground, through an RC network (the RC network being the parallel combination of (i) a resistor (e.g., a 200 ohm resistor) and (ii) the series combination of a capacitor (e.g., a 20 pF capacitor) and a resistor (e.g., a 10 ohm resistor). In FIG. 3, the connections are the same, although the positions of the wirebonds relative to each other are different: in FIG. 3 the first wirebond 205 is between the second and third wirebonds 205, whereas in FIG. 2, the second wirebond 205 is between the first and third wirebonds 205. The wirebonds are illustrated in FIG. 2A as inductors, although they may be otherwise modeled, e.g., as coupled transmission lines, or as collections of finite elements in a finite element model, as discussed below.

Figure 2B:
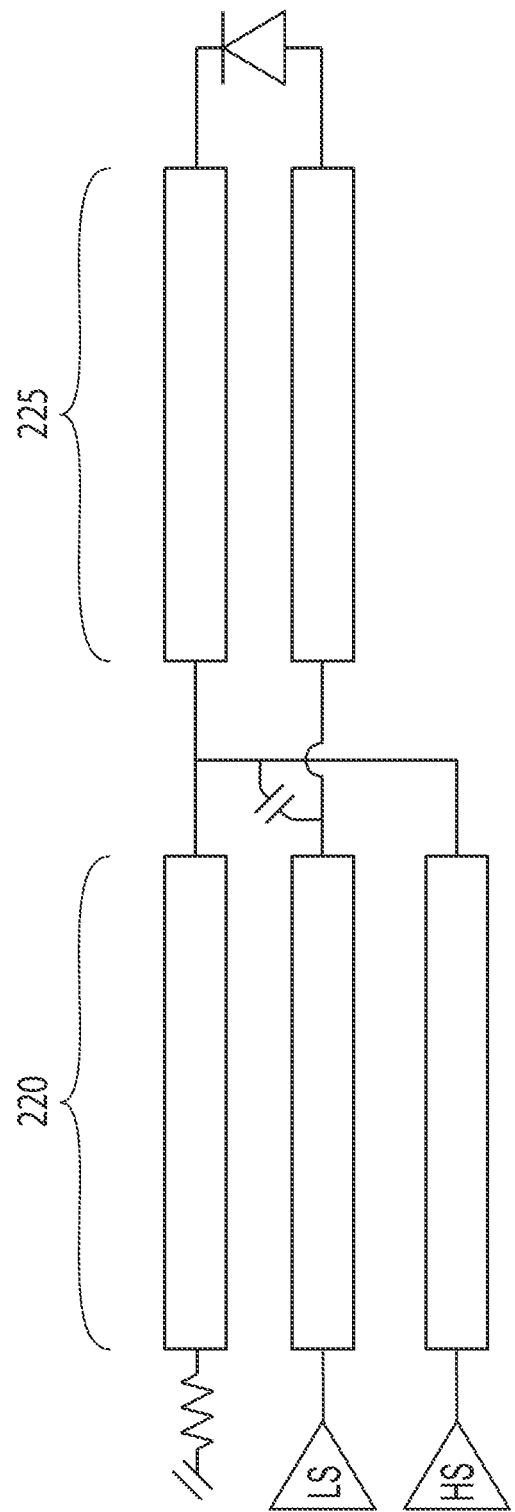
FIG. 2B is a circuit for driving a two-terminal device, according to an embodiment of the present disclosure.
Figure 3:
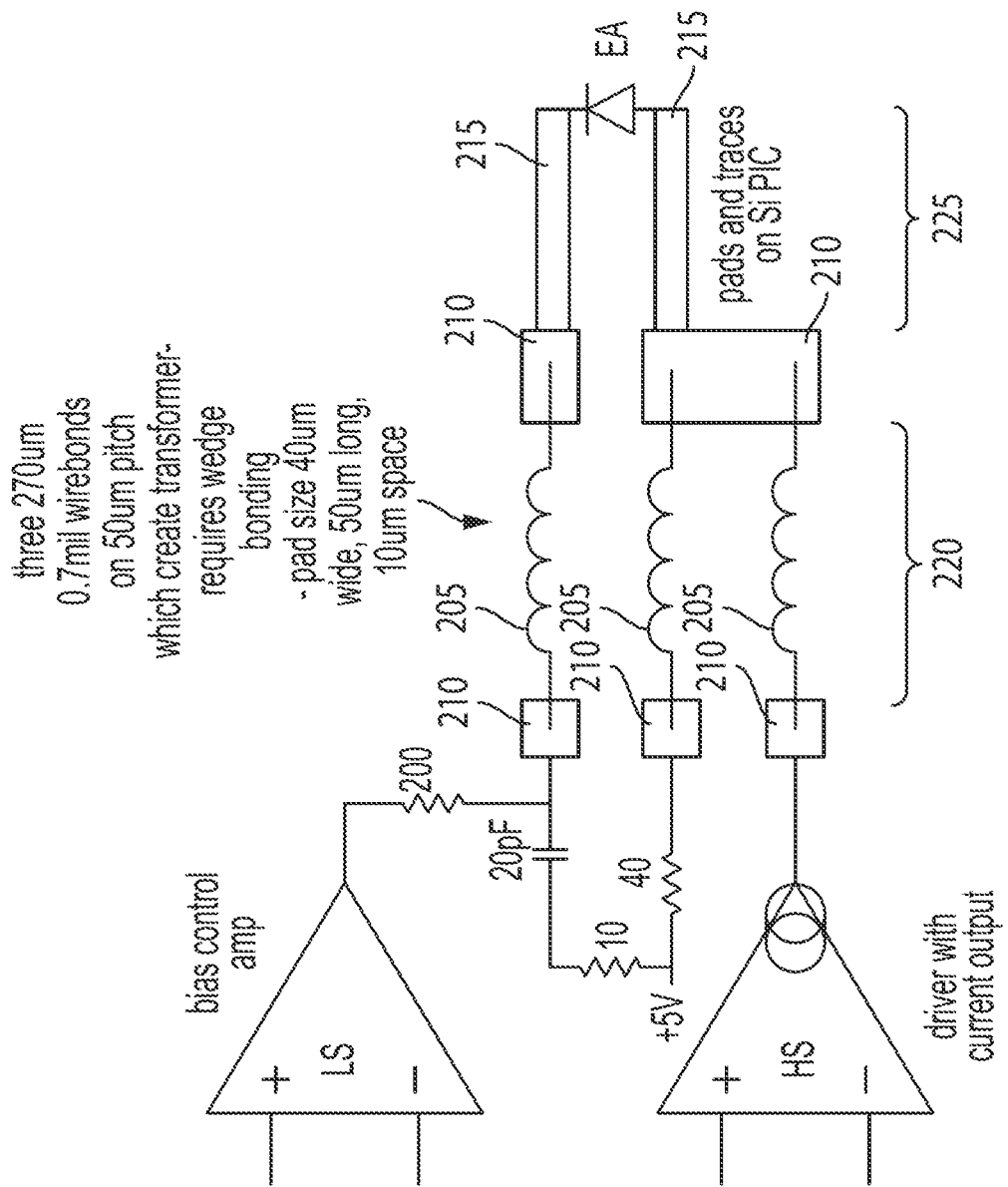
FIG. 3 is a circuit for driving a two-terminal device, according to an embodiment of the present disclosure.

FIG. 2B shows an approximate equivalent circuit model for the circuit of FIG. 2A. In the circuit of FIG. 2B, a first set of coupled transmission lines 220 (including three transmission lines) is used to model the three wirebonds, and a second set of coupled transmission lines 225 (including two transmission lines) is used to model the traces connecting the EA to the wirebond pads. In some embodiments the conductors corresponding to the first set of coupled transmission lines 220 and the second set of coupled transmission lines 225 may be different from those of the embodiment of FIG. 2A; for example, the first set of coupled transmission lines 220 may be conductive traces and the second set of coupled transmission lines 225 may be wirebonds.

The behavior of the circuit of FIG. 2A may be analyzed numerically, in two steps. First, the behavior of the wirebonds 205 may be analyzed using a finite-element electromagnetic model, to produce, for each of a set of frequencies, a model (e.g., in the form of S-parameters) of the wirebonds 205, represented as a multi-terminal (e.g., 6-terminal) linear circuit element. The behavior of the conductive traces 215 may be similarly analyzed to generate a model, represented as a multi-terminal (e.g., 4-terminal) linear circuit element. Second, the models of the first set of coupled transmission lines 220 and the second set of coupled transmission lines 225 may then be incorporated into circuit analysis software (e.g., linear, frequency domain circuit analysis software) which may solve for the currents and potentials at various nodes in the circuit, as a function of frequency. Analysis of this kind may be used to select various parameters that may affect the performance of the circuit. Such an analysis has shown, for an exemplary embodiment, that such a circuit may provide a bandwidth greater than 35 GHz, e.g., approaching 50 GHz. FIG. 3 shows a circuit similar to that of FIG. 2A, which may be analyzed in an analogous manner, and which may also provide a bandwidth greater than 35 GHz, e.g., approaching 50 GHz.

As used herein, a "set of coupled transmission lines" is a set of conductors all having substantially the same length (e.g., none of the conductors of the set of conductors being more than twice as long as any of the other conductors of the set of conductors), each of the conductors having a first end point in a first region, at a first end of the set of coupled transmission lines and a second end point in a second region, at a second end of the set of coupled transmission lines. As such, the set of three wirebonds 205 is a set of three coupled transmission lines; the first region may be the set of wirebond pads 210 at one end of the set of wirebonds, and the second region may be the set of wirebond pads 210 at the other end of the set of wirebonds.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the word "or" is inclusive, so that, for example, "A or B" means any one of (i) A, (ii) B, and (iii) A and B.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "directly connected" or "directly coupled" to another element, there are no intervening elements present. As used herein, "generally connected" means connected by an electrical path that may contain arbitrary intervening elements, including intervening elements the presence of which qualitatively changes the behavior of the circuit. As used herein, "connected" means (i) "directly connected" or (ii) connected with intervening elements, the intervening elements being ones (e.g., low-value resistors or inductors, or short sections of transmission line) that do not qualitatively affect the behavior of the circuit.

Although exemplary embodiments of an enhanced bandwidth interconnect have been specifically described and illustrated herein, many modifications and variations will be apparent to those skilled in the art. Accordingly, it is to be understood that an enhanced bandwidth interconnect constructed according to principles of this disclosure may be embodied other than as specifically described herein. The invention is also defined in the following claims, and equivalents thereof.

What is claimed is:

1. A circuit, comprising:
a two-terminal device; and
a network for forming a connection to the two-terminal device,
the network comprising:
   a first set of coupled transmission lines; and
   a second set of coupled transmission lines,
a second end of the first set of coupled transmission lines being connected to a first end of the second set of coupled transmission lines, and
a second end of the second set of coupled transmission lines being connected to the two-terminal device,
wherein:
the first set of coupled transmission lines comprises three transmission lines;
the second set of coupled transmission lines comprises two transmission lines; and
at the second end of the first set of coupled transmission lines:
   a first transmission line of the first set of coupled transmission lines is connected to a first transmission line of the second set of coupled transmission lines,
   a second transmission line of the first set of coupled transmission lines is connected to a second transmission line of the second set of coupled transmission lines,
   a third transmission line of the first set of coupled transmission lines is connected to the first transmission line of the second set of coupled transmission lines.

2. The circuit of claim 1, wherein the first end of the first transmission line of the first set of coupled transmission lines is connected to RF ground through a resistor.

3. The circuit of claim 2, wherein a first end of the second transmission line of the first set of coupled transmission lines is connected to RF ground through a resistor-capacitor network, the resistor-capacitor network being a parallel combination of:
a first resistor, and
a series combination of a second resistor and a capacitor.

4. The circuit of claim 3, wherein a first end of the third transmission line of the first set of coupled transmission lines is connected to a high-speed driver.

5. The circuit of claim 4, wherein the transmission lines of the first set of coupled transmission lines are arranged side by side with a middle transmission line in the middle, and the other two transmission lines on either side of the middle transmission line.

6. The circuit of claim 5, wherein the middle transmission line is the second transmission line of the first set of coupled transmission lines.

7. The circuit of claim 5, wherein the middle transmission line is the first transmission line of the first set of coupled transmission lines.

8. The circuit of claim 1, wherein the first set of coupled transmission lines comprises three wirebonds.

9. The circuit of claim 1, wherein the second set of coupled transmission lines comprises two conductive traces.

10. The circuit of claim 1, wherein the two-terminal device is an electro-absorption modulator.

11. The circuit of claim 1, wherein the two-terminal device is a photodiode.

\* \* \* \* \*